US012606413B2

(12) United States Patent
Hirabayashi et al.

(10) Patent No.: US 12,606,413 B2
(45) Date of Patent: Apr. 21, 2026

(54) ELEVATOR CONTROL DEVICE

(71) Applicant: Mitsubishi Electric Corporation, Tokyo (JP)

(72) Inventors: Kazufumi Hirabayashi, Tokyo (JP); Hidetaka Ishiguro, Tokyo (JP); Eiji Yokoyama, Tokyo (JP); Hiroyuki Sekiguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1534 days.

(21) Appl. No.: 16/973,034

(22) PCT Filed: Sep. 25, 2018

(86) PCT No.: PCT/JP2018/035426
§ 371 (c)(1),
(2) Date: Dec. 8, 2020

(87) PCT Pub. No.: WO2020/065718
PCT Pub. Date: Apr. 2, 2020

(65) Prior Publication Data
US 2021/0269278 A1 Sep. 2, 2021

(51) Int. Cl.
*B66B 1/30* (2006.01)
*B66B 1/34* (2006.01)

(52) U.S. Cl.
CPC .............. *B66B 1/30* (2013.01); *B66B 1/3492* (2013.01)

(58) Field of Classification Search
CPC ................................ B66B 1/30; B66B 1/3492
See application file for complete search history.

(56) References Cited

U.S. PATENT DOCUMENTS

2010/0187046 A1* 7/2010 Stolt ........................ H02P 29/02 187/293
2012/0226414 A1 9/2012 Tomizaki et al.
2013/0240302 A1* 9/2013 Blanc ........................ G01H 3/00 187/292

FOREIGN PATENT DOCUMENTS

CN 101024463 A 8/2007
JP 64-83742 A 3/1989
JP 2004-115159 A 4/2004
(Continued)

OTHER PUBLICATIONS

International Search Report and Written Opinion mailed on Nov. 20, 2018, received for PCT Application No. PCT/JP2018/035426, filed on Sep. 25, 2018, 11 pages including English Translation.
(Continued)

*Primary Examiner* — Jianchun Qin
(74) *Attorney, Agent, or Firm* — XSENSUS LLP

(57) ABSTRACT

Provided is an elevator control device that can control uncomfortable vibration in a car by using simple calculation. The elevator control device includes, in an elevator in which the car and a counter weight are supported by a main rope wound around a sheave of a motor, a car speed instruction value generator that generates a car speed instruction value with respect to the car; a motor speed controller that controls a motor drive circuit that controls rotation of the motor, based on a motor speed instruction value; and a car vibration control calculator that outputs to the motor speed controller the motor speed instruction value having, relative to the car speed instruction value, a reduced component of a vibration frequency of vibration generated in the car.

12 Claims, 8 Drawing Sheets

(56) References Cited

FOREIGN PATENT DOCUMENTS

| | | | | |
|---|---|---|---|---|
| JP | 2004-123256 A | | 4/2004 |
| JP | 2005-51865 A | | 2/2005 |
| JP | 2007223760 A | * | 9/2007 |
| JP | 2009012932 A | * | 1/2009 |
| JP | 2011-112164 A | | 6/2011 |

OTHER PUBLICATIONS

Office Action mailed Nov. 21, 2023, in Corresponding Indian Application No. 202047049364, 3 pages.
Indian Office Action issued Jun. 1, 2021 in the corresponding Indian patent application No. 202047049364.
Office Action issued Feb. 12, 2023 in Chinese Patent Application No. 201880096501.0, 12 pages.
Office Action issued on Nov. 23, 2022, in corresponding Chinese patent Application No. 201880096501.0, 13 pages.
1 Office Action dated Jul. 1, 2022 in the corresponding Chinese patent application No. 201880096501.0.

* cited by examiner

ELEVATOR CONTROL DEVICE

CROSS-REFERENCE TO RELATED APPLICATION

The present application is based on PCT filing PCT/JP2018/035426, filed Sep. 25, 2018, the entire contents of which are incorporated herein by reference.

FIELD

The present invention relates to an elevator control device.

BACKGROUND

PTL 1 discloses an elevator control device. According to the control device, uncomfortable vibration in a car can be controlled by using a notch filter or the like.

CITATION LIST

Patent Literature

[PTL 1] JP 2004-123256 A

SUMMARY

Technical Problem

However, the control device described in PTL 1 requires, as parameters used in the notch filter or the like, various mechanical parameters such as a rope spring constant and a rope viscosity coefficient. This requires complicated calculation.

The present invention has been made to solve the above-described problem. An object of the present invention is to provide an elevator control device that can control uncomfortable vibration in a car by using simple calculation.

Solution to Problem

An elevator control device according to the present invention includes, in an elevator having a car and a counter weight, in which the car and the counter weight are supported by a main rope wound around a sheave of a motor, a car speed instruction value generator that generates a car speed instruction value with respect to the car; a motor speed controller that controls a motor drive circuit that controls rotation of the motor, based on a motor speed instruction value; and a car vibration control calculator that outputs to the motor speed controller the motor speed instruction value having, relative to the car speed instruction value, a reduced component of a vibration frequency of vibration generated in the car.

Advantageous Effects of Invention

According to the present invention, the motor speed instruction value is a value having, relative to the car speed instruction value, the reduced component of the vibration frequency of the vibration generated in the car. Thus, uncomfortable vibration in the car can be controlled by simple calculation.

DESCRIPTION OF EMBODIMENT

An embodiment of the present invention will be described according to the attached drawings. Note that, in the figures, the same or corresponding portions are denoted by the same reference signs. Repetitive descriptions of the portions will be simplified or omitted as appropriate.

Embodiment 1

Figure 1:
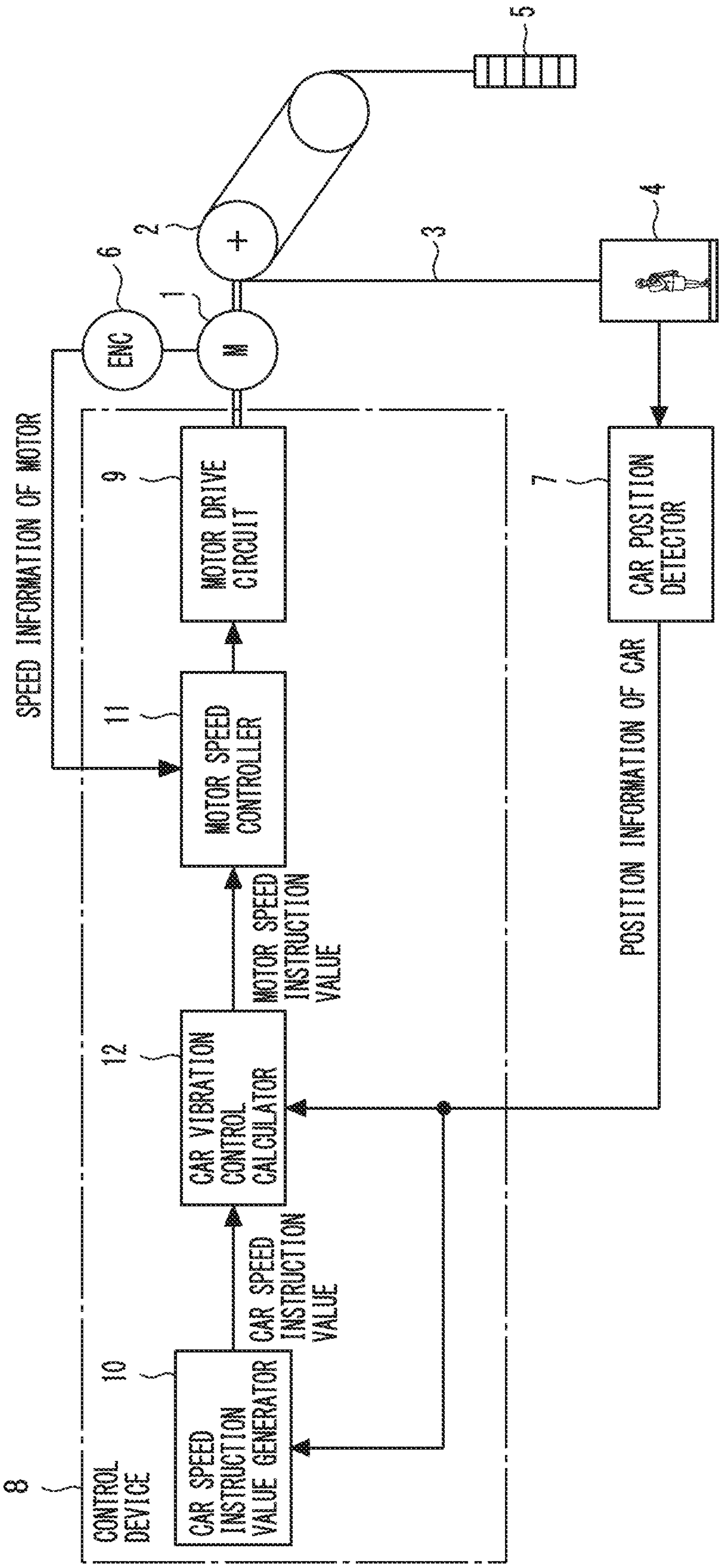
FIG. 1 is a block diagram of an elevator system to which an elevator control device in Embodiment 1 is applied.

FIG. 1 is a block diagram of an elevator system to which an elevator control device in Embodiment 1 is applied.

In the elevator system of FIG. 1, a hoistway not illustrated penetrates each floor of a building not illustrated. A machine room not illustrated is provided immediately above the hoistway. Each of a plurality of halls not illustrated is provided in each floor of the building. Each of the plurality of halls faces to the hoistway.

A motor 1 is provided in the machine room. A sheave 2 is provided in the motor 1. A main rope 3 is wound around the sheave 2.

A car 4 is provided inside the hoistway. The car 4 is provided so as to be able to be guided in the vertical direction by a guide rail not illustrated. The car 4 is supported by one side of the main rope 3. A counter weight 5 is provided inside the hoistway. The counter weight 5 is provided so as to be able to be guided in the vertical direction by the guide rail not illustrated. The counter weight 5 is supported by the other side of the main rope 3.

A motor speed detector 6 is electrically connected to the motor 1. The motor speed detector 6 is provided so as to be able to detect a rotation speed of the motor 1. The motor speed detector 6 is provided so as to be able to output speed information of the motor 1 according to the rotation speed of the motor 1.

A car position detector 7 is provided so as to be able to detect a position of the car 4. The car position detector 7 is provided so as to be able to output position information of the car 4 according to the position of the car 4.

A control device 8 is provided in the machine room. The control device 8 is provided so as to be able to entirely control an elevator.

For example, the control device 8 rotates the motor 1. At this time, the sheave 2 rotates following the rotation of the motor 1. The main rope 3 moves following the rotation of the sheave 2. The car 4 and the counter weight 5 move up and down in directions opposite to each other following the move of the main rope 3.

For example, the control device 8 includes a motor drive circuit 9, a car speed instruction value generator 10, a motor speed controller 11, and a car vibration control calculator 12.

The motor drive circuit 9 is provided so as to be able to drive the motor 1.

The car speed instruction value generator 10 is provided so as to be able to generate a car speed instruction value based on operation information of the elevator and the position information of the car 4.

The motor speed controller 11 is provided so as to be able to generate a control signal for appropriately driving the motor drive circuit 9, based on a motor speed instruction value and the speed information of the motor 1.

The car vibration control calculator 12 is provided so as to be able to calculate the motor speed instruction value having, relative to the car speed instruction value, a reduced component of a vibration frequency of vibration generated in the car 4, based on the car speed instruction value and the position information of the car 4.

Next, a role of the car vibration control calculator 12 will be described with reference to FIG. 2.

Figure 2:
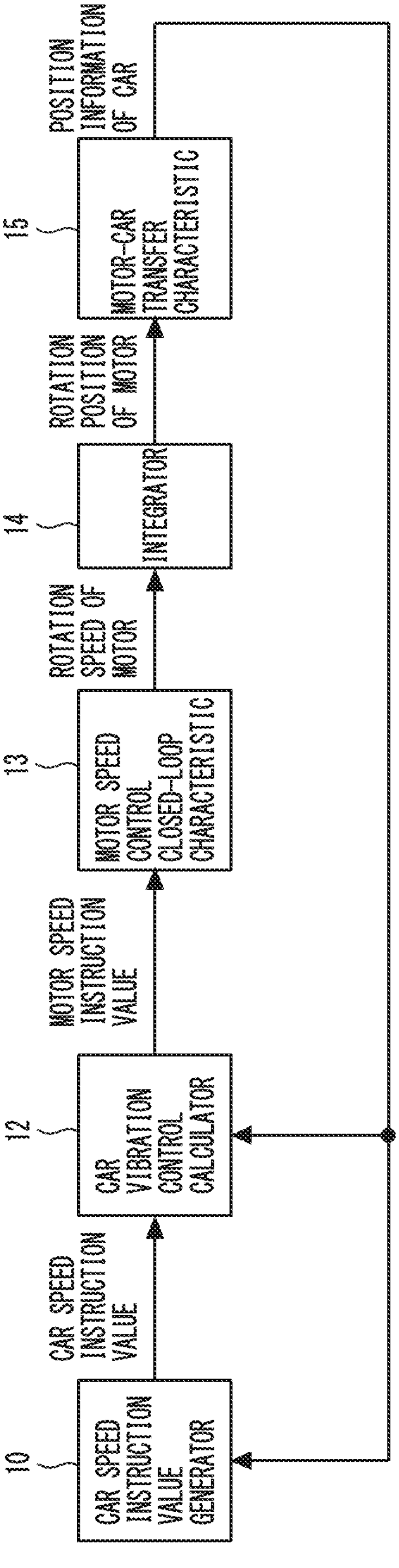
FIG. 2 is a block diagram for describing a role of a car vibration control calculator of the elevator control device in Embodiment 1.

FIG. 2 is a block diagram for describing a role of the car vibration control calculator of the elevator control device in Embodiment 1.

In FIG. 2, a motor speed control closed-loop characteristic 13 is a functional block in which the motor speed controller 11, the motor drive circuit 9, the motor 1, and the motor speed detector 6 are summarized. The motor speed control closed-loop characteristic 13 functions so that the rotation speed of the motor 1 follows the motor speed instruction value.

An integrator 14 is a functional block that converts the rotation speed of the motor 1 into a rotation position of the motor 1.

A motor-car transfer characteristic 15 is a functional block of a transfer characteristic from the rotation position of the motor 1 to the position of the car 4. The motor-car transfer characteristic 15 exhibits complex behavior. In the motor-car transfer characteristic 15, an effect of a vibration angular frequency $\omega_c$ of the main rope 3 between the car 4 and the sheave 2 is dominant.

At this time, when the motor-car transfer characteristic 15 is a second order lag element, the motor-car transfer characteristic 15 is represented by $G_{car}(s)$ of the following expression (1).

[Math. 1]

$$G_{car}(s) = \frac{2\zeta_c\omega_c s + \omega_c^2}{s^2 + 2\zeta_c\omega_c s + \omega_c^2} \tag{1}$$

Here, $\zeta_c$ is an attenuation coefficient of the main rope 3 between the car 4 and the sheave 2.

In $G_{car}(s)$, a length of the main rope 3 between the car 4 and the sheave 2 varies depending on the position of the car 4. Thus, the vibration angular frequency $\omega_c$ varies depending on the position of the car 4.

The car vibration control calculator 12 generates an inverse characteristic of $G_{car}(s)$ at a creation stage of the motor speed instruction value to cancel a component of the vibration generated in the car 4. Specifically, the car vibration control calculator 12 creates a signal in which a component of a vibration frequency of the main rope 3 is removed from the car speed instruction value and sets the signal as the motor speed instruction value. Note that the inverse characteristic of $G_{car}(s)$ is grasped through theoretical calculation or on-site learning.

As a result, vibration generated in the motor-car transfer characteristic 15 is controlled. For example, the control of the vibration is performed not only when the car 4 is running in normal operation but also, in some cases, when the car 4 is being operated for releveling so that a floor surface of the car 4 and a floor surface of the hall coincide with each other before boarding and alighting of a user.

Here, as an example where the car 4 tends to vibrate the most, a case where the attenuation coefficient $\zeta_c$ of the main rope 3 between the car 4 and the sheave 2 is 0 will be described. In this case, the expression (1) is transformed into the following expression (2).

[Math. 2]

$$G_{car}(s) = \frac{\omega_c^2}{s^2 + \omega_c^2} = \frac{1}{s^2\omega_c^{-2} + 1} \tag{2}$$

The car vibration control calculator 12 generates an inverse characteristic of the motor-car transfer characteristic 15, namely, the component $(s^2\omega_c^{-2}+1)$ of the denominator on the right side of the expression (2). As a result, a vibration characteristic of $G_{car}(s)$ is canceled.

Next, a configuration of the car vibration control calculator 12 will be described with reference to FIG. 3.

Figure 3:
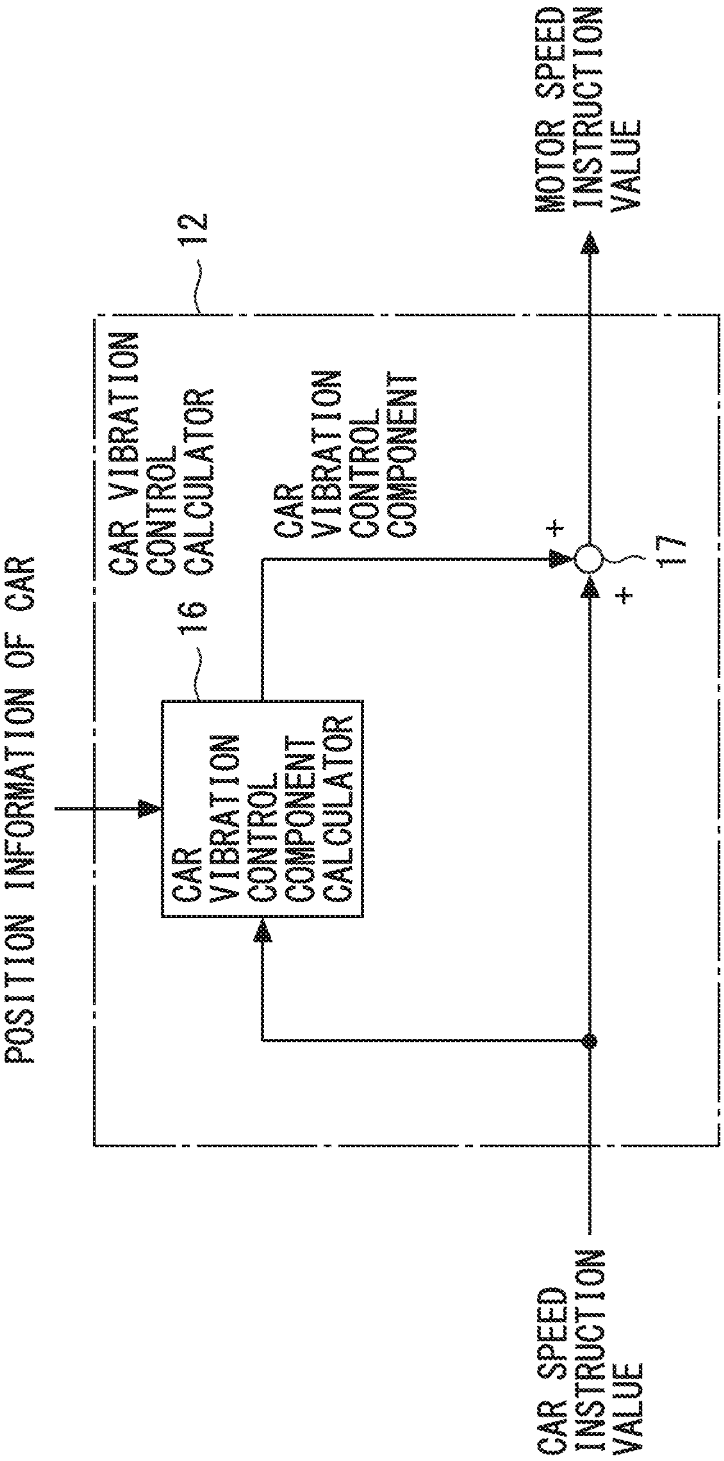
FIG. 3 is a block diagram for describing a configuration of the car vibration control calculator of the elevator control device in Embodiment 1.

FIG. 3 is a block diagram for describing a configuration of the car vibration control calculator of the elevator control device in Embodiment 1.

The component $(s^2\omega_c^{-2}+1)$ of the denominator on the right side of the expression (2), from the viewpoint of the design of the car vibration control calculator 12, can be considered a configuration of adding to the car speed instruction value a car vibration control component in which the car speed instruction value is subject to a plurality of differentiation processes and then multiplied by a coefficient.

In the configuration, the motor speed instruction value in which a component of the vibration angular frequency $\omega_c$ of the main rope 3 between the car 4 and the sheave 2 is removed is generated. When the motor speed instruction value is input to the motor speed controller 11 not illustrated in FIG. 3, the vibration generated in the motor-car transfer characteristic 15 is controlled.

At this time, the component of the vibration angular frequency $\omega_c$ varies depending on the position of the car 4. Thus, when the component of the vibration angular frequency $\omega_c$ is handled, the position information of the car 4 is required.

Accordingly, the car vibration control calculator 12 is configured to output the motor speed instruction value by using the car speed instruction value and the position information of the car 4 as inputs. Specifically, as shown in FIG. 3, the car vibration control calculator 12 includes a car vibration control component calculator 16 and an adder 17.

The car vibration control component calculator 16 is provided so as to be able to output the car vibration control component by using the car speed instruction value and the position information of the car 4 as inputs. The adder 17 is provided so as to be able to add the car vibration control component which is an output of the car vibration control component calculator 16 and the car speed instruction value.

For example, when the car vibration control calculator 12 calculates the component ($s^2\omega_c^{-2}+1$) of the denominator on the right side of the expression (2), the car vibration control component calculator 16 calculates $s^2\omega_c^{-2}$ by multiplying a second-order differentiation component of the car speed instruction value by an inverse component of the square of the vibration angular frequency $\omega_c$ of the main rope 3 between the car 4 and the sheave 2.

Next, a configuration of the car vibration control component calculator 16 will be described with reference to FIG. 4.

Figure 4:
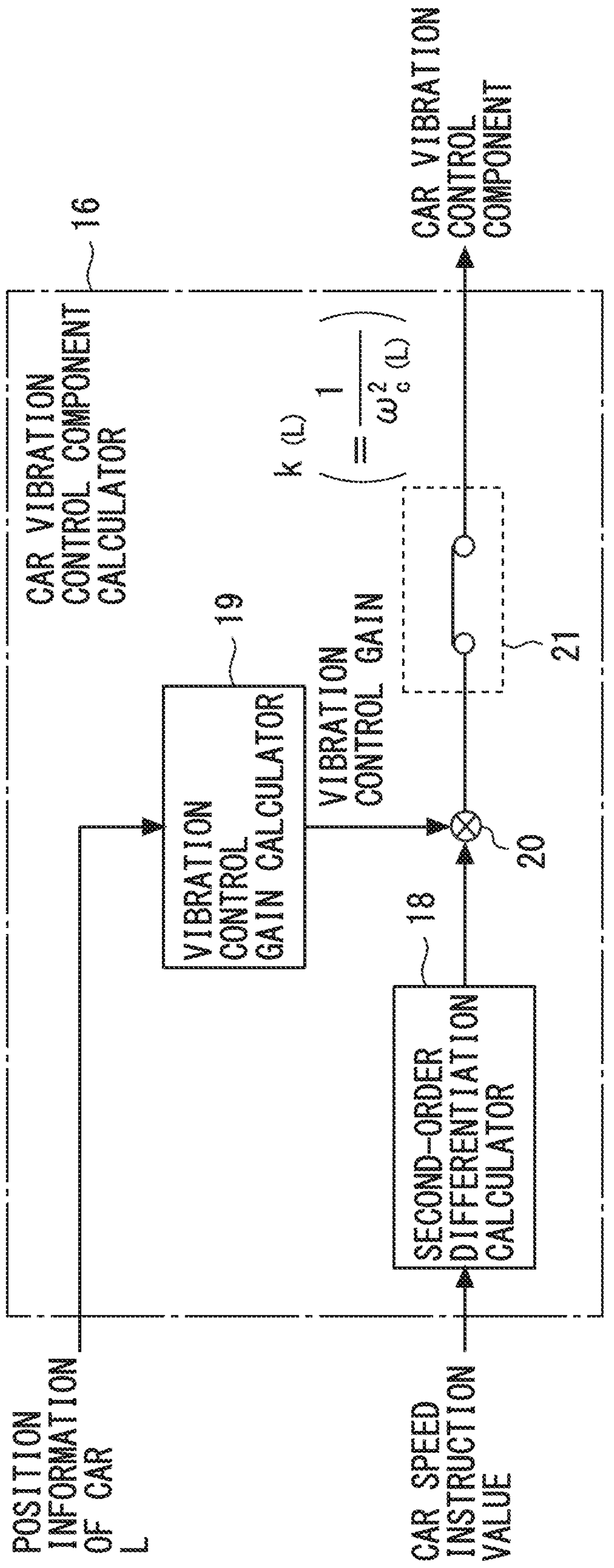
FIG. 4 is a block diagram for describing a configuration of a car vibration control component calculator of the elevator control device in Embodiment 1.

FIG. 4 is a block diagram for describing a configuration of the car vibration control component calculator of the elevator control device in Embodiment 1.

A component $1/\omega_{cd}^2$ obtained by multiplying the inverse component of the square of the vibration angular frequency $\omega_c$ is defined as a vibration control gain. The vibration control gain includes the component of the vibration angular frequency c. Thus, the vibration control gain varies depending on the position of the car 4.

As shown in FIG. 4, the car vibration control component calculator 16 includes a second-order differentiation calculator 18, a vibration control gain calculator 19, a multiplier 20, and a change-over switch 21.

The second-order differentiation calculator 18 is a functional block that performs second-order differentiation of the car speed instruction value. Here, in the second-order differentiation calculation process, approximate differentiation may be used instead.

The vibration control gain calculator 19 is a functional block that receives an input of the position information of the car 4 and outputs the vibration control gain corresponding to the position of the car 4.

The multiplier 20 is a functional block that calculates the car vibration control component by multiplying a component of the second-order differentiation of the car speed instruction value from the second-order differentiation calculator 18 and the vibration control gain from the vibration control gain calculator 19.

The change-over switch 21 is a functional block provided on the output side of the multiplier 20. The change-over switch 21 is normally in a closed condition. When control of the vibration of the car 4 is desired to be avoided for some reason, the change-over switch 21 becomes in an opened condition. For example, the change-over switch 21 opens and closes according to an operation mode of the elevator.

Note that the car vibration control calculator 12 is configured to add the car speed instruction value and the car vibration control component. This facilitates a configuration when a vibration control function is switched between effective and ineffective.

Next, an example of a configuration of the vibration control gain calculator 19 will be described.

The vibration control gain varies depending on the position of the car 4. Thus, in the vibration control gain calculator 19, the vibration control gain may be held as information such as a data table in which the position of the car 4 and the vibration control gain are associated with each other. Furthermore, in the vibration control gain calculator 19, at least one vibration control gain at a position where the car 4 is present may be grasped, and by linear approximation using the point as a starting point, the vibration control gain may be calculated.

When the car 4 is on the top floor side, the length of the main rope 3 between the car 4 and the sheave 2 becomes short. At this time, the main rope 3 between the car 4 and the sheave 2 can be considered to be in a rigidity condition. In this case, the vibration angular frequency $\omega_c$ becomes high. At this time, the vibration control gain ($1/\omega_c^2$) can be considered 0.

When the car 4 is on the bottom floor side, the length of the main rope 3 between the car 4 and the sheave 2 becomes long. At this time, the main rope 3 between the car 4 and the sheave 2 becomes in the most shakable condition. In this case, the vibration angular frequency co becomes low. At this time, the vibration control gain ($1/\omega_c^2$) becomes a large value.

In this case, linear approximation may be performed by using properties of a basic configuration of the elevator. Specifically, the linear approximation may be performed by using a characteristic in which the vibration control gain becomes largest on the bottom floor and becomes close to 0 in the vicinity of the top floor.

For example, the linear approximation may be performed by holding information of the vibration control gain on the bottom floor and setting the vibration control gain on the top floor as 0. For example, the linear approximation may be performed by holding information of the vibration control gain on any floor and setting the vibration control gain on the top floor as 0. For example, the linear approximation may be performed by holding information of the vibration control gain on any two floors. For example, the linear approximation may be performed by holding information of the vibration control gain on any two or more floors. In these cases, the vibration control gain is grasped at a practically acceptable accuracy.

Next, a method for grasping the vibration control gain by the vibration control gain calculator 19 will be described with reference to FIG. 5.

Figure 5:
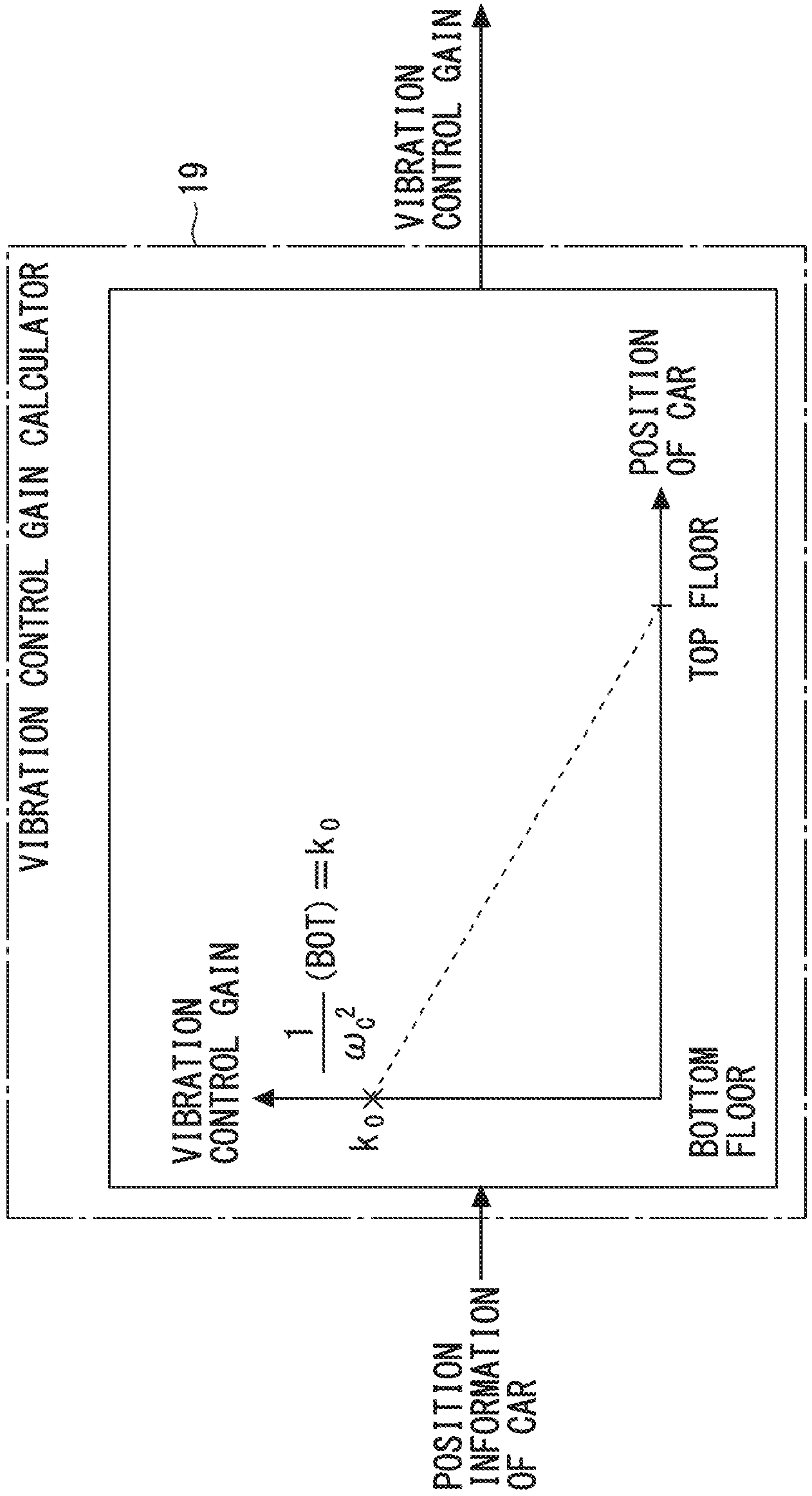
FIG. 5 is a figure for describing a method for grasping a vibration control gain by a vibration control gain calculator of the elevator control device in Embodiment 1.

FIG. 5 is a figure for describing a method for grasping the vibration control gain by the vibration control gain calculator of the elevator control device in Embodiment 1.

FIG. 5 shows an example of the linear approximation in a case where the information of the vibration control gain on the bottom floor is held and the vibration control gain on the top floor is set as 0.

The vibration control gain is grasped through theoretical calculation or on-site learning. For example, the vibration control gain is learned based on information of a speed of the car 4 at the time of acceleration and deceleration on site. For example, the vibration control gain is learned based on, not limited to the information of the speed of the car 4 at the time of acceleration and deceleration, information such as the position, speed, and acceleration of the car 4 or the motor 1 and a torque of the motor 1. According to the on-site learning, with respect to each of mechanical elements such as change over time in a spring constant of the main rope 3 and a viscosity coefficient of the main rope 3, the vibration control gain which is accordingly appropriate is grasped.

Next, an example of the motor speed instruction value when the car 4 runs from the top floor to the bottom floor will be described with reference to FIG. 6.

Figure 6:
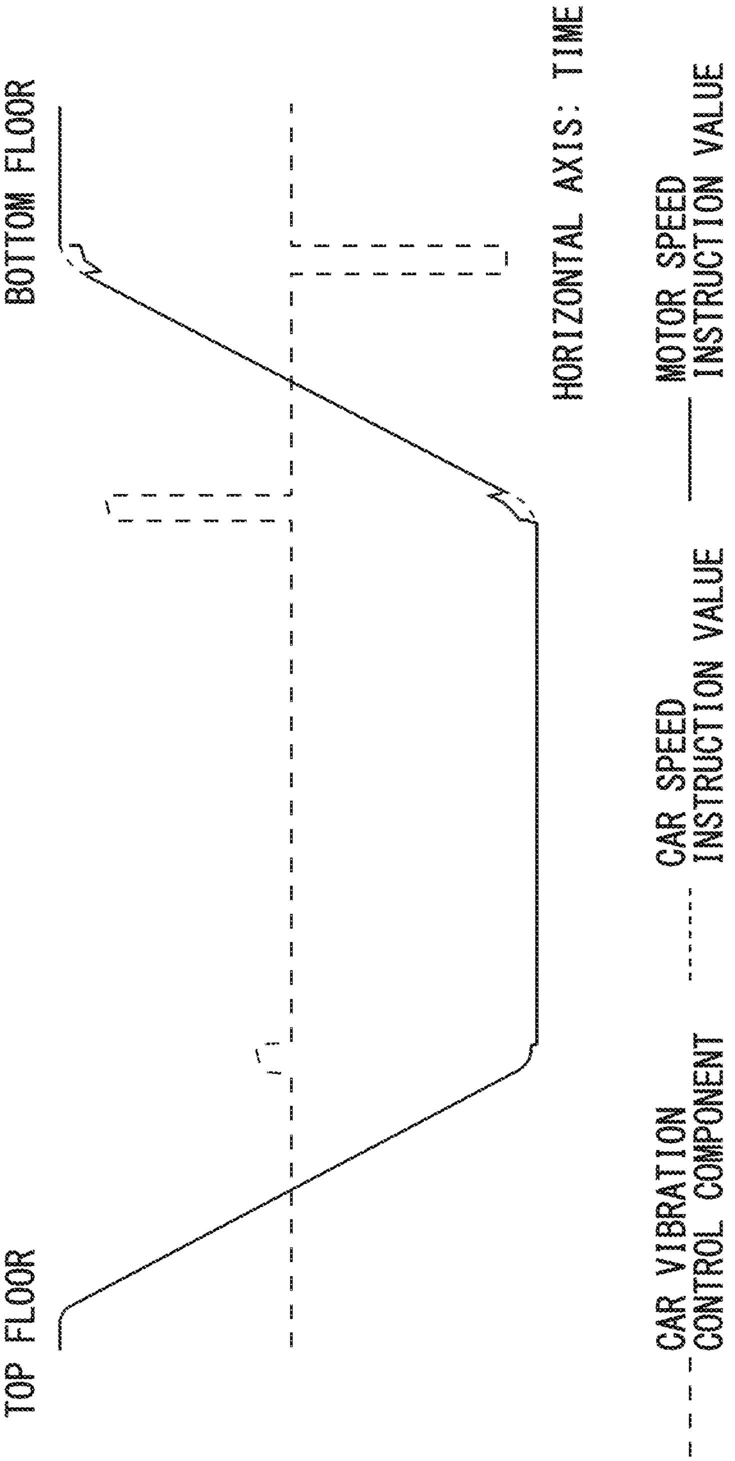
FIG. 6 is a figure showing an example of a motor speed instruction value by the elevator control device in Embodiment 1.

FIG. 6 is a figure showing an example of the motor speed instruction value by the elevator control device in Embodiment 1.

The motor speed instruction value of FIG. 6 is a value in which the car vibration control component obtained by multiplying the second-order differentiation component of the car speed instruction value by the vibration control gain varying depending on the position of the car 4 is superimposed on the car speed instruction value. As shown in FIG. 6, on the bottom floor, many car vibration control components are required.

Next, an outline of a motion of the control device 8 will be described with reference to FIG. 7.

Figure 7:
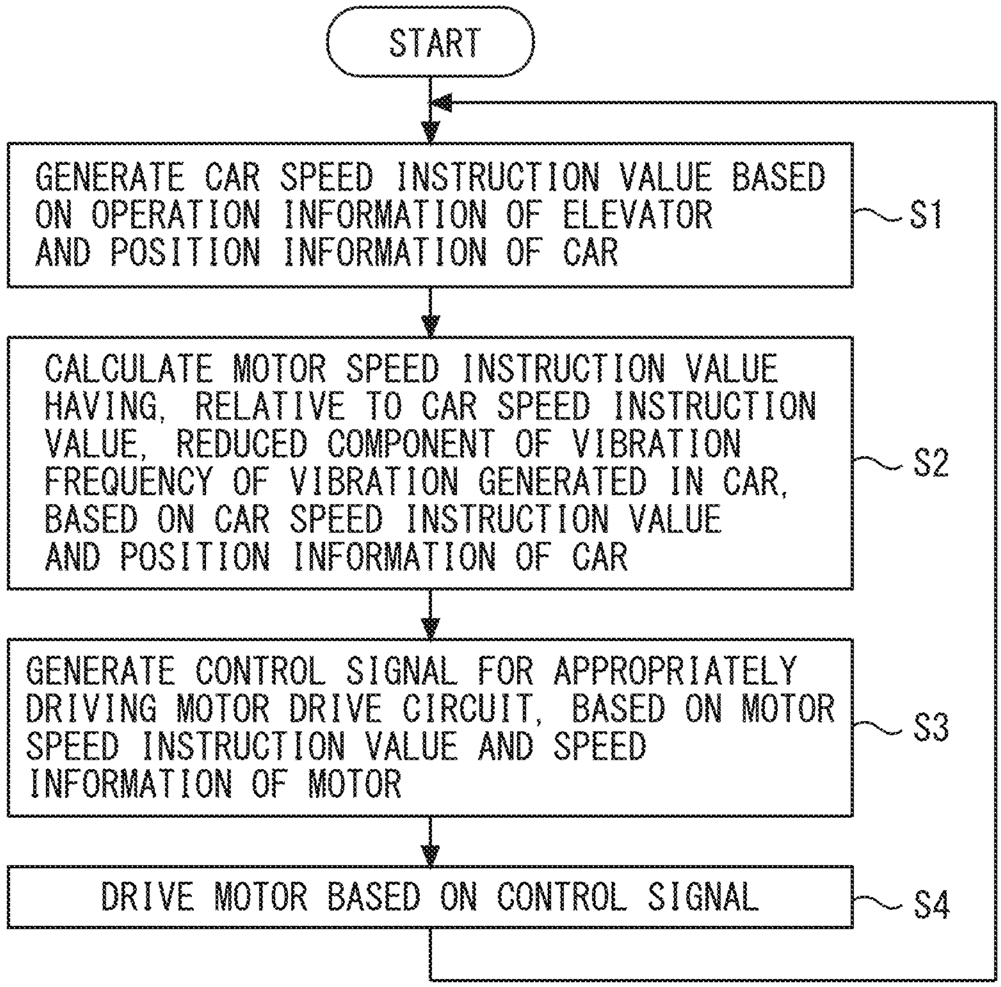
FIG. 7 is a flowchart for describing an outline of a motion of the elevator control device in Embodiment 1.

FIG. 7 is a flowchart for describing an outline of a motion of the elevator control device in Embodiment 1.

In step S1, the control device 8 generates the car speed instruction value based on the operation information of the elevator and the position information of the car 4. Thereafter, the control device 8 performs a motion of step S2. In step S2, the control device 8 calculates the motor speed instruction value having, relative to the car speed instruction value, the reduced component of the vibration frequency of the vibration generated in the car 4, based on the car speed instruction value and the position information of the car 4.

Thereafter, the control device 8 performs a motion of step S3. In step S3, the control device 8 generates the control signal for appropriately driving the motor drive circuit 9, based on the motor speed instruction value and the speed information of the motor 1. Thereafter, the control device 8 performs a motion of step S4. In step S4, the control device 8 drives the motor 1 based on the control signal. Thereafter, the control device 8 repeats the motions from step S1.

According to Embodiment 1 described above, the motor speed instruction value is a value having, relative to the car speed instruction value, the reduced component of the vibration frequency of the vibration generated in the car 4. At this time, the vibration frequency changes based on the position information of the car 4 inside the hoistway of the elevator. Thus, uncomfortable vibration of the car 4 which tends to occur at the time of acceleration and deceleration of the car 4 due to an effect of a spring characteristic of the main rope 3, which becomes conspicuous at high rise, can be controlled by feedforward control using simple calculation. As a result, an elevator with good ride comfort can be provided.

Furthermore, the car vibration control component is calculated based on the car speed instruction value and the position information of the car 4. Specifically, the vibration control gain is calculated based on the vibration angular frequency present in the main rope 3 between the car 4 and the sheave 2. Furthermore, the vibration control gain is calculated only by linear interpolation. Thus, the number of held vibration control parameters and the amount of calculation for each position of the car 4 can be greatly reduced.

Furthermore, whether or not to reflect the car vibration control component in the motor speed instruction value can be easily switched by the change-over switch 21. In the present embodiment, the car vibration control component calculator 16 is a differentiator. Thus, it is easy to understand a timing in which the vibration control component becomes 0. As a result, by simple calculation, a timing of switching whether or not to reflect the car vibration control component in the motor speed instruction value can be easily determined.

Furthermore, the vibration frequency of the vibration generated in the car 4 is set as the vibration angular frequency present in the main rope 3 between the car 4 and the sheave 2. Thus, also with respect to each of the mechanical elements such as change over time in the mechanical elements and the viscosity coefficient of the main rope 3, the car vibration control component appropriate according to the actual situation can be calculated.

Note that, when the attenuation coefficient $\zeta_c$ of the main rope 3 between the car 4 and the sheave 2 is not 0, the vibration of the car 4 can be further controlled.

Furthermore, the control device 8 of Embodiment 1 may be applied to an elevator with no machine room. Also in this case, uncomfortable vibration of the car 4 can be controlled.

Next, an example of the control device 8 will be described with reference to FIG. 8.

Figure 8:
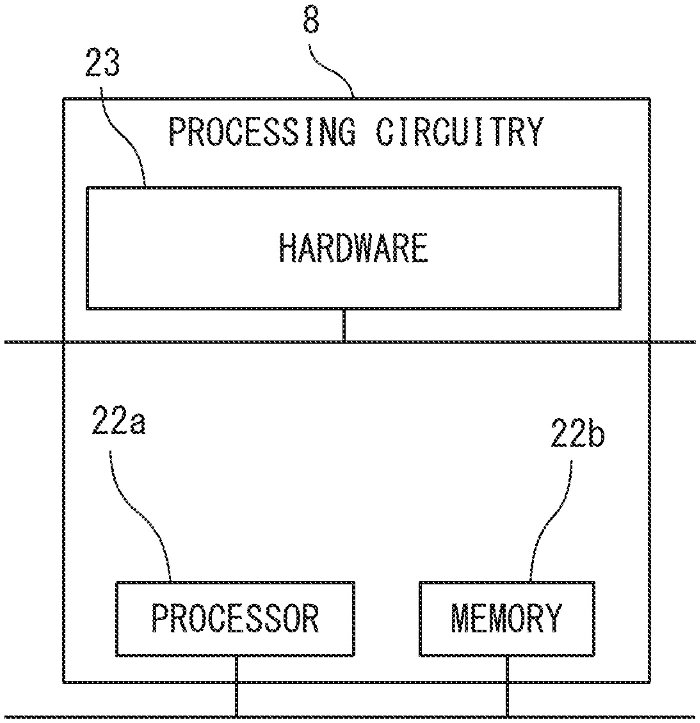
FIG. 8 is a hardware block diagram of the elevator control device in Embodiment 1.

FIG. 8 is a hardware block diagram of the elevator control device in Embodiment 1.

Functions of the control device 8 can be implemented by a processing circuitry. For example, the processing circuitry includes at least one processor 22*a* and at least one memory 22*b*. For example, the processing circuitry includes at least one exclusive hardware 23.

When the processing circuitry includes the at least one processor 22*a* and the at least one memory 22*b*, the functions of the control device 8 are implemented by software, firmware, or a combination of software and firmware. At least one of the software and the firmware is described as a program. At least one of the software and the firmware is stored in the at least one memory 22*b*. The at least one processor 22*a* implements the functions of the control device 8 by reading and executing the program stored in the at least one memory 22*b*. The at least one processor 22*a* is also called a central processing unit, a processing unit, a calculation device, a microprocessor, a microcomputer, or a DSP. For example, the at least one memory 22*b* is a nonvolatile or volatile semiconductor memory such as a RAM, a ROM, a flash memory, an EPROM, or an EEPROM, a magnetic disk, a flexible disk, an optical disk, a compact disk, a mini disk, a DVD, or the like.

When the processing circuitry includes the at least one exclusive hardware 23, the processing circuitry is implemented by, for example, a single circuit, a composite circuit, a programmed processor, a parallel programmed processor, an ASIC, an FPGA, or a combination thereof. For example, the functions of the control device 8 are individually implemented by the processing circuitry. For example, the functions of the control device 8 are implemented together by the processing circuitry.

A part of the functions of the control device 8 may be implemented by the exclusive hardware 23, and the others may be implemented by the software or the firmware. For example, the function of the car vibration control calculator 12 may be implemented by the processing circuitry as the exclusive hardware 23, and functions other than the function of the car vibration control calculator 12 may be implemented by reading and executing the program in which the at least one processor 22*a* is stored in the at least one memory 22*b*.

Thus, the processing circuitry implements the functions of the control device 8 by the hardware 23, the software, the firmware, or a combination thereof.

INDUSTRIAL APPLICABILITY

As described above, the elevator control device according to the present invention can be used for an elevator system.

REFERENCE SIGNS LIST

1 Motor
2 Sheave
3 Main rope
4 Car
5 Counter weight
6 Motor speed detector
7 Car position detector
8 Control device

9 Motor drive circuit
10 Car speed instruction value generator
11 Motor speed controller
12 Car vibration control calculator
13 Motor speed control closed-loop characteristic
14 Integrator
15 Motor-car transfer characteristic
16 Car vibration control component calculator
17 Adder
18 Second-order differentiation calculator
19 Vibration control gain calculator
20 Multiplier
21 Change-over switch
22*a* Processor
22*b* Memory
23 Hardware

The invention claimed is:

1. An elevator control device for use with an elevator including a car and a counter weight, the car and the counter weight being supported by a main rope wound around a sheave of a motor, the elevator control device comprising:

a car speed instruction value generator configured to generate a car speed instruction value with respect to the car;

a motor speed controller configured to control a motor drive circuit configured to control rotation of the motor, based on a motor speed instruction value; and a car vibration control calculator configured to output to the motor speed controller the motor speed instruction value comprising, relative to the car speed instruction value, a reduced component of a vibration frequency of vibration generated in the car, wherein the car vibration control calculator comprises a car vibration control component calculator configured to calculate a vibration control component of the car based on the car speed instruction value, and wherein the car vibration control component calculator comprises:

a second-order differentiation calculator configured to calculate a second-order differentiation component of the car speed instruction value;

a vibration control gain calculator configured to calculate a vibration control gain from position information of the car, the vibration control gain being a component obtained by multiplying an inverse component of a square of a vibration angular frequency present in the main rope between the car and the sheave; and a multiplier configured to calculate the vibration control component of the car by multiplying the second-order differentiation component of the car speed instruction value and the vibration control gain.

2. The elevator control device according to claim 1, wherein the car vibration control calculator is configured to output the motor speed instruction value comprising the reduced component of the vibration frequency configured to change based on position information of the car inside a hoistway of the elevator.

3. The elevator control device according to claim 1, wherein the car vibration control calculator further comprises:

an adder configured to add the car speed instruction value and the vibration control component of the car.

4. The elevator control device according to claim 1, wherein the vibration control gain calculator is configured to hold information of a vibration control gain at at least one position of the car inside a hoistway of the elevator and calculate a vibration control gain by performing linear interpolation according to position information of the car inside the hoistway of the elevator.

5. The elevator control device according to claim 4, wherein the vibration control gain calculator is configured to grasp the vibration control gain through on-site learning.

6. The elevator control device according to claim 1, wherein the car vibration control calculator comprises a function of generating an inverse characteristic of a transfer characteristic from the motor to the car.

7. The elevator control device according to claim 1, wherein the car vibration control calculator is configured to change the inverse characteristic of the transfer characteristic from the motor to the car, according to position information of the car inside a hoistway of the elevator.

8. The elevator control device according to claim 1, wherein the car vibration control calculator is configured to grasp the transfer characteristic from the motor to the car, through on-site learning.

9. The elevator control device according to claim 1, wherein the car vibration control calculator is configured to consider the transfer characteristic from the motor to the car as a second order lag element.

10. The elevator control device according to claim 1, wherein the car vibration control calculator is configured to set a vibration angular frequency of the main rope between the car and the sheave as the vibration frequency of the vertical vibration of the car.

11. An elevator control device for use with an elevator including a car and a counter weight, the car and the counter weight being supported by a main rope wound around a sheave of a motor, the elevator control device comprising:

a car speed instruction value generator configured to generate a car speed instruction value with respect to the car;

a motor speed controller configured to control a motor drive circuit configured to control rotation of the motor, based on a motor speed instruction value; and a car vibration control calculator configured to output to the motor speed controller the motor speed instruction value comprising, relative to the car speed instruction value, a reduced component of a vibration frequency of vibration generated in the car, the car vibration control calculator being configured to output the motor speed instruction value comprising the reduced component of the vibration frequency configured to change based on position information of the car inside a hoistway of the elevator, the car vibration control calculator comprising:

a car vibration control component calculator configured to calculate a vibration control component of the car based on the car speed instruction value; and an adder configured to add the car speed instruction value and the vibration control component of the car, the car vibration control component calculator comprising:

a second-order differentiation calculator configured to calculate a second-order differentiation component of the car speed instruction value;

a vibration control gain calculator configured to calculate a vibration control gain from position information of the car, the vibration control gain being a component obtained by multiplying an inverse component of a square of a vibration angular frequency present in the main rope between the car and the sheave; and a multiplier configured to calculate the vibration control component of the car by multiplying the second-order differentiation component of the car speed instruction value and the vibration control gain, the vibration control gain calculator being configured to hold information of an inverse component of a square of a vibration angular frequency at at least one position of the car inside the hoistway of the elevator and calculate a vibration control gain by performing linear interpolation of the inverse component of the square of the vibration angular frequency according to the position information of the car inside the hoistway of the elevator.

12. An elevator control device for use with an elevator including a car and a counter weight, the car and the counter weight being supported by a main rope wound around a sheave of a motor, the elevator control device comprising:

a car speed instruction value generator configured to generate a car speed instruction value with respect to the car;

a motor speed controller configured to control a motor drive circuit configured to control rotation of the motor, based on a motor speed instruction value;

a car vibration control calculator configured to output to the motor speed controller the motor speed instruction value comprising, relative to a component of a vibration frequency of vertical vibration of the car included in the car speed instruction value, a reduced component of the vibration frequency of the vertical vibration of the car; and a change-over switch configured to switch whether or not to reflect in the motor speed instruction value a car vibration control component generated by the car vibration control calculator, according to an operation mode of the elevator, wherein the car vibration control calculator comprises:

a car vibration control component calculator configured to calculate a vibration control component of the car based on the car speed instruction value; and an adder configured to add the car speed instruction value and the vibration control component of the car.

* * * * *